(12) United States Patent
Virnes et al.

(10) Patent No.: US 10,019,738 B2
(45) Date of Patent: Jul. 10, 2018

(54) ARRANGEMENT AND METHOD FOR FITTING ROOMS

(71) Applicant: MARIELLA LABELS OY, Vantaa (FI)

(72) Inventors: Jenni Virnes, Helsinki (FI); Minna Nurmisalo, Espoo (FI)

(73) Assignee: MARIELLA LABELS OY, Vantaa (FI)

( * ) Notice: Subject to any disclaimer, the term of this patent is extended or adjusted under 35 U.S.C. 154(b) by 0 days.

(21) Appl. No.: 15/523,525

(22) PCT Filed: Oct. 27, 2015

(86) PCT No.: PCT/FI2015/050735
§ 371 (c)(1),
(2) Date: May 1, 2017

(87) PCT Pub. No.: WO2016/071563
PCT Pub. Date: May 12, 2016

(65) Prior Publication Data
US 2017/0342731 A1    Nov. 30, 2017

(30) Foreign Application Priority Data

Nov. 7, 2014  (FI) ..................................... 20145979
May 27, 2015  (FI) ..................................... 20155399

(51) Int. Cl.
*G08B 13/24*    (2006.01)
*G06Q 30/02*    (2012.01)
(Continued)

(52) U.S. Cl.
CPC .......... *G06Q 30/0281* (2013.01); *G06F 7/06* (2013.01); *G06K 7/10* (2013.01); *G06K 19/077* (2013.01);
(Continued)

(58) Field of Classification Search
CPC ........... G06Q 30/0281; G06Q 30/0282; G06Q 30/0641; G06Q 30/0643; H04B 5/0056;
(Continued)

(56) References Cited

U.S. PATENT DOCUMENTS 6,313,745 B1    11/2001  Suzuki
7,123,146 B1    10/2006  Holzman
(Continued)

FOREIGN PATENT DOCUMENTS

DE    102 47 859 A1    4/2004
FI        124853 B     2/2015
(Continued)

OTHER PUBLICATIONS

International Search Report (PCT/ISA/210) issued in PCT/FI2015/050735, dated Jan. 28, 2016.
(Continued)

*Primary Examiner* — Van Trieu
(74) *Attorney, Agent, or Firm* — Birch, Stewart, Kolasch & Birch, LLP

(57) ABSTRACT

An arrangement and a method for observing fitting rooms (100) and/or fitting areas (200), wherein following steps are performed in the method: detecting number, type, size and/or color of products brought to the fitting room and/or fitting area by detecting presence of remotely readable identification tags, electronic article surveillance tags and/or electronic price labels in the fitting room and/or fitting area (200) and reading product information linked to the remotely readable identification tag, electronic article surveillance tag and/or electronic price label, comparing detected number, type, size and/or color of products to predefined criteria, the criteria relating to the number, type, size and/or color of products, and generating an alarm based
(Continued)

on the detected number, type, size and/or color of products if at least one predefined criterion is fulfilled.

12 Claims, 5 Drawing Sheets

(51) Int. Cl.
*G06F 7/06* (2006.01)
*G06K 7/10* (2006.01)
*G06Q 30/00* (2012.01)
*G06K 19/077* (2006.01)
*G06Q 10/00* (2012.01)
*E04H 1/12* (2006.01)

(52) U.S. Cl.
CPC ............ *G06Q 10/00* (2013.01); *G06Q 30/00* (2013.01); *G06Q 30/0282* (2013.01); *G08B 13/246* (2013.01); *G08B 13/248* (2013.01); *E04H 1/1266* (2013.01)

(58) Field of Classification Search
CPC ...... H04B 5/0062; H04B 5/0068; H04B 5/02; G08B 13/2402; G08B 13/2405; G08B 13/2428; G08B 13/246; G08B 13/2462; G08B 13/248; G08B 13/2485
See application file for complete search history.

(56) References Cited

U.S. PATENT DOCUMENTS

| 9,477,980 | B2* | 10/2016 | Zagel ............... G06K 9/00369 |
| 2009/0179825 | A1 | 7/2009 | Enarvi et al. |
| 2009/0289775 | A1 | 11/2009 | Kubota et al. |
| 2011/0040653 | A1 | 2/2011 | Hur |
| 2011/0072132 | A1 | 3/2011 | Shafer et al. |
| 2012/0280040 | A1 | 11/2012 | Carney et al. |
| 2014/0035913 | A1* | 2/2014 | Higgins ................. G06T 17/00 345/420 |
| 2014/0058880 | A1 | 2/2014 | Konaxis |
| 2014/0279294 | A1* | 9/2014 | Field-Darragh ..... G06Q 10/087 705/28 |
| 2014/0379532 | A1* | 12/2014 | Agasti ............... G06Q 30/0641 705/27.1 |
| 2015/0262230 | A1* | 9/2015 | Cypher ............. G06Q 30/0251 705/14.49 |
| 2016/0063588 | A1* | 3/2016 | Gadre ............... G06Q 30/0623 705/26.61 |

FOREIGN PATENT DOCUMENTS

| JP | 11-175857 A | 7/1999 |
| JP | 2000-048270 A | 2/2000 |
| JP | 2004-003058 A | 1/2004 |
| WO | WO 00/67110 A1 | 11/2000 |
| WO | WO 2005/020171 A1 | 3/2005 |
| WO | WO 2009/106686 A1 | 9/2009 |

OTHER PUBLICATIONS

Search Report issued in Finnish Patent Application No. 20145979 dated Jun. 10, 2015.
Search Report issued in Finnish Patent Application No. 20155399 dated Nov. 12, 2015.
Written Opinion (PCT/ISA/237) issued in PCT/FI2015/050735, dated Jan. 28, 2016.

* cited by examiner

ARRANGEMENT AND METHOD FOR FITTING ROOMS

FIELD OF THE INVENTION

The invention relates to an arrangement and method for fitting rooms and dressing rooms. The invention also relates to electronic article surveillance systems and electronic price label systems.

BACKGROUND OF THE INVENTION

Conventionally, the product related information, such as price, is attached to products like clothes with hanging tags made of e.g. paper or similar material. This information can be attached to the product at the place of manufacturing or it can be later added to the product. At least when local information, local price or updated price is to be attached to the product this has to be done manually in the store. The new prices are printed out on paper or a corresponding material, and these pieces with their new price markings are attached manually to existing tags on the products. Thus, an employee must first find the correct product where the tag has to be updated and the new tag is attached in its position. A disadvantage in this arrangement is, among other things, the fact that the arrangement is very laborious and there is a high risk of mistakes. In case of a mistake, a situation may occur, in which the price information on the price tags on the product conflicts with the price information in the cash register system.

Also electronic price label systems are known which offer automatic updating of prices to an electronic label that will facilitate and accelerate the updating of the price information to a significant extent. Electronic price label systems are systems used by retailers for displaying product pricing e.g. on shelves. Typically, electronic shelf labels are implemented as electronic display modules that are attached to the front edge of retail shelving. These modules use different technologies to show the current product price and also other information to the customer. A communication network allows the price display to be automatically updated whenever a product price is changed. This automated system reduces pricing management labor costs and improves pricing accuracy.

Electronic price label systems are particularly suitable for use in large shops or supermarkets that offer thousands or tens of thousands product items for sale, whose prices must be updated frequently and correctly.

The electronic price display modules can be updated from a centralized control system via wired or wireless communication. All-wired systems have obvious problems in terms of the layout limitations caused by complicated cabling due to the high number of individual electronic price label displays. Wireless systems have their major technological bottleneck in the need for individual power supplies for each electronic price label display unit and requirement for long power supply lifetime, i.e. operational lifetime for the batteries. In addition, the wireless systems need to be able to provide reliable communication channel in an environment that has high number of individual receiver-transmitter units that in order to prolong the battery life, need to operate with minimum transmitting power levels.

A display technology that is suitable for electronic price label applications is a so called Electronic Paper Display (EPD) that possesses a paper-like high contrast appearance, ultra-low power consumption, and a thin, light form. EPD's aim is to give the viewer the experience of reading from paper, while providing the capability to electronically update the displayed information. EPD's are technology enabled, as one possibility, by electronic ink. Such ink carries an electrical charge enabling it to be updated through electronics. Electronic ink is well suited for EPD's as it is a reflective technology which requires no front or backlight, is viewable under a wide range of lighting conditions, including direct sunlight, and requires no power to maintain an image. Electrical power is only consumed when the displayed data is changed. In order become widely applied in different type of applications, wireless electronic price labels or corresponding electronically controlled wireless displays are faced with a number of requirements that are partly dictated by the manufacturing process and partly by the end use, for example, the use, environment and manageability in a store by the store personnel.

WO0067110 discloses a display unit for electronic shelf price label system that utilizes electronic ink and EPD technology. The electronic display unit in WO0067110 features a printable electronic display comprising an encapsulated electrophoretic display medium. The resulting electronic display is flexible and has in large measure the applications of a printed display. Further, since the encapsulated electrophoretic display medium used in the present invention can be printed, the display itself can be made inexpensively. The encapsulated electrophoretic display medium is an optoelectronically active material which comprises at least two phases: an electrophoretic contrast media phase and a coating/binding phase. The electrophoretic display medium can form, for example, a full color, multi-color, or two color (e. g. black and white) display. The electrophoretic phase comprises at least one species of encapsulated electrophoretic particles, having distinct physical and electrical characteristics, dispersed in a clear or dyed suspending fluid. The coating/binding phase includes a polymer matrix that surrounds the electrophoretic phase. In this embodiment, the polymer in the polymeric binder is capable of being dried, cross linked, or otherwise cured as in traditional inks, and therefore a printing process can be used to deposit the encapsulated electrophoretic display medium onto a substrate.

Also radio-frequency based electronic article surveillance systems are known which are used to prevent shoplifting from retail stores, pilferage of books from libraries or removal of properties from office buildings. Special tags are fixed to products and these tags are removed or deactivated by the personnel of the store when the item is properly bought or checked out. At the exits of the store, a detection system sounds an alarm or otherwise alerts the staff when it senses active tags.

Also fitting areas, fitting rooms or dressing rooms are known in the prior art. They are usually e.g. small single-user cubicles where a person may try on clothes or in case of fitting areas, bigger areas where there are plurality of fitting rooms. These can often be found at retail stores where one would want to try on clothes before purchasing them.

With the solutions of the prior art fitting rooms don't have any automatic electronic article surveillance systems for preventing shop lifting. With the systems of prior art someone from the personnel of the store is needed to manually monitor how many articles are taken in to the fitting room by examining the person when he/se enters the fitting room area and leaves the fitting room area. Also someone is needed to monitor how many articles are left to the fitting room after the person has left the fitting room.

SUMMARY OF THE INVENTION

It is an aim of the present invention to solve the above mentioned problems and simultaneously provide an arrangement and method for a fitting room and dressing room to able to automatically detect unordinary situations in the fitting room or fitting area.

In the solution of the present invention fitting rooms and/or fitting areas are monitored by the following steps: detecting number, type, size and/or color of products, such as clothes, brought to the fitting room and/or fitting area, comparing detected number, type, size and/or color of products to predefined criteria, the criteria relating to the number, type, size and/or color of products, and generating an alarm based on the detected number, type, size and/or color of products if at least one predefined criteria is fulfilled. Detecting number, type, size and/or color of products brought to the fitting room and/or fitting area is carried out by detecting presence of remotely readable identification tags, electronic article surveillance tags and/or electronic price labels in the fitting room and/or fitting area and reading product information linked to the remotely readable identification tag, electronic article surveillance tag and/or electronic price label.

The advantage of the solution of the present invention is that it enables an automatic arrangement which monitors fitting rooms and/or fitting areas and helps to prevent shop lifting. With the arrangement of the present invention no-one is needed to manually monitor how many articles are taken in to the fitting room by examining the person when he/she enters the fitting room area and leaves the fitting room area. The arrangement of the present invention is able to automatically detect in real time unordinary situations such as theft attempts in the fitting room or fitting area. The system is also adaptive and able to learn and able to provide the alarms essentially in real time.

DESCRIPTION OF THE DRAWINGS

In the following, the invention will be described in more detail by means of an embodiment example with reference to the appended drawings, in which.

DETAILED DESCRIPTION OF THE INVENTION

Figure 1:
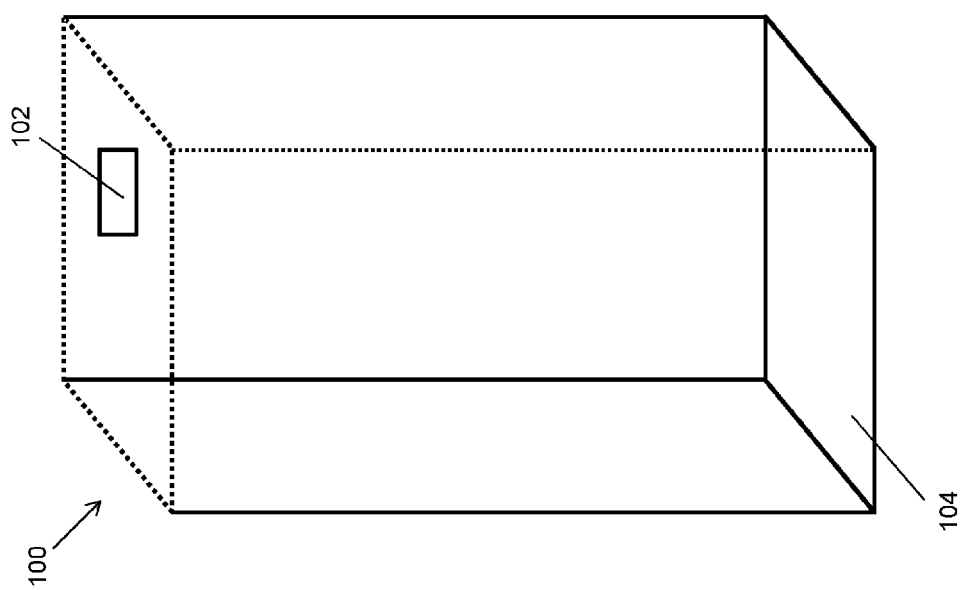
FIG. 1 presents a schematic and simplified view of an example arrangement for a fitting room according to the present invention.

In the solution of the invention the arrangement is able to detect automatically unordinary situations in fitting rooms or fitting areas. This has been achieved by the solution of the invention by performing following steps: detecting number, type, size and/or colour of products brought to the fitting room and/or fitting area, comparing detected number, type, size and/or colour of products to predefined criteria, the criteria relating to the number, type, size and/or colour of products and generating an alarm based on the detected number, type, size and/or colour of products if at least one predefined criterion is fulfilled.

Products can be detected by reading information of a remotely readable identification tag, electronic article surveillance tag and/or electronic price label linked and/or attached to products. In one embodiment of the solution of the present invention detecting number, type, size and/or colour of products brought to the fitting room and/or fitting area is carried out by detecting presence of remotely readable identification tags, electronic article surveillance tags and/or electronic price labels 102 in the fitting room 100 and/or fitting area and reading product information linked to the remotely readable identification tag, electronic article surveillance tag and/or electronic price label. The remotely readable identification tag, electronic article surveillance tag or electronic label can have information of the product stored to tag or label itself and in this case it's possible to read product information directly from remotely readable identification tag, electronic article surveillance tag and/or electronic price label. The product information can also be read from a database based on the information of the remotely readable identification tag, electronic article surveillance tag and/or electronic price label, e.g. based on the identifier of the tag or price label.

The alarm can be generated if the system detects unordinary situations such as theft attempts in the fitting room or fitting area. E.g. the following example criteria can be used as criteria for generating alarms:

more than two sizes and/or colour of a same product is brought in the fitting room or fitting area, more than two different sizes of a same product is brought in the fitting room or fitting area, more than one different types of products is brought in the fitting room or fitting area, e.g. clothes for children, men and/or women.

If one criterion is fulfilled, e.g. one criterion presented above, an alarm can be generated. The alarm can be created to the store managing system or control system and it can also be forwarded to the personnel of the store, e.g. to a mobile device such as a mobile phone or tablet. The arrangement can also inform in which location, i.e. in which fitting room or fitting area such number, type, size and/or colour of products were detected which fulfilled the predefined criteria.

Alarms can have different kind of alarm-levels. Different alarm-levels can be indicated e.g. with different colours, lights or other markings and/or sounds. The alarm levels can e.g. comprise three levels e.g. green, yellow and red level. The criteria for the green level could be for example that 1 to 6 products are detected in the fitting room or fitting area. The criteria for the yellow level could be for example that 7 to 11 products are detected in the fitting room or fitting area. The criteria for the red level could be for example that more than 11 products are detected in the fitting room or fitting area.

FIG. 1 presents schematically, as an example, an arrangement of an embodiment of the present invention.

An arrangement of the present invention can be arranged to a fitting area, such as fitting room or dressing room. The arrangement can comprise means for detecting arrival, departure and/or presence of a person 104 to/from a fitting room 100 and means for detecting presence and/or number of remotely readable identification tags, electronic article surveillance tags and/or electronic price labels 102. The remotely readable identification tags, an electronic article surveillance tags and/or electronic price labels 102 can have unique identifiers or alternatively they can be identifiers which are not unique but their presence can be detected.

Detecting arrival, departure and/or presence of a person can be performed with motion detection or a planar sensor system installed e.g. on the floor of the fitting area. The sensor can be e.g. a planar sensor described in WO2005020171-publication. Detecting presence and/or number of remotely readable identification tag, electronic article surveillance tags and/or electronic price labels can be done e.g. with an RFID-reader such as an RFID-gate.

In one embodiment of the invention means for detecting arrival, departure and/or presence of a person to/from a fitting room and means for detecting presence and/or number of remotely readable identification tags, electronic article surveillance tags and/or electronic price labels can be integrated to a same sensor, e.g. planar floor sensor, or same structure or device which is installed e.g. to the fitting area. The sensor can e.g. be a sensor described in WO2009106686-publication. In another embodiment means for detecting arrival, departure and/or presence of a person to/from a fitting room and means for detecting presence and/or number of remotely readable identification tags, electronic article surveillance tags and/or electronic price labels can be separate sensors or devices. E.g. if planar sensor is used it can be used in one embodiment of the invention for only for detecting movement and or presence of a person and in another embodiment also for detecting presence of the remotely readable identification tags, electronic article surveillance tags or electronic price labels and also transfer data between the arrangement and remotely readable identification tags, electronic article surveillance tags or electronic price labels.

In one embodiment of the invention when a person enters the fitting room, the arrangement is able to detect the entrance of a person and the means for detecting presence and/or number of remotely readable identification tags, electronic article surveillance tags and/or electronic price labels, e.g. RFID-reader, is activated and it detects the presence and/or number of remotely readable identification tags, electronic article surveillance tags and/or electronic price labels and reads information of the tag or label and links it to certain products. After that the arrangement is able to compare the detected information to the predefined criteria and generate an alarm is predefined criteria is fulfilled.

In one embodiment of the invention if signal to an electronic article surveillance tag is lost a notification and/or alarm can also been generated by the arrangement.

In one embodiment of the invention if another person enters the fitting room while another person is already inside the fitting room, an alarm or a notification can be made.

In one embodiment of the invention the arrangement has a database or connection to a database and it can record to the database how many times certain product and/or certain type, color and/or size of product has been taken into fitting room.

In one embodiment of the invention means for detecting entrance, departure and/or presence of a person in a fitting room can be configured to measure the fitting room and also optionally in proximity of the entrance of the fitting room outside the fitting room. If planar sensors installed to the floor are used, they can be installed to the floor of the fitting room and also optionally in front of the fitting room to make the detection of entrance and/or departure more precise.

Figure 2A:
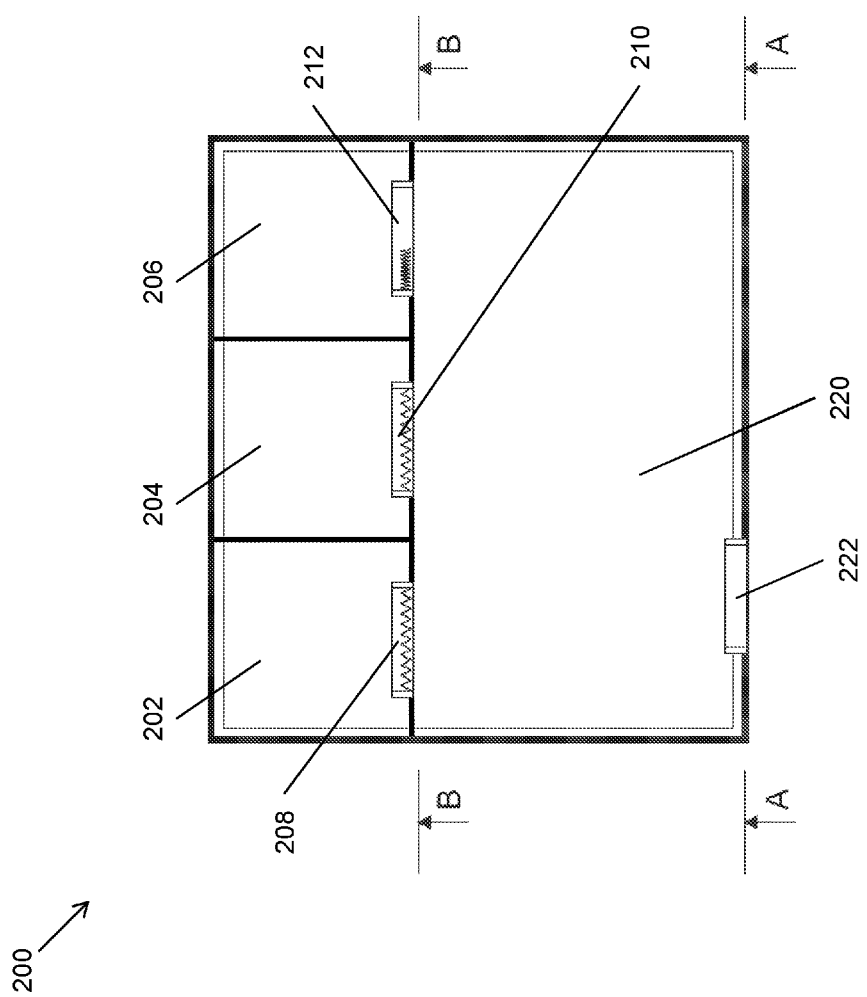
FIGS. 2A-C present a schematic and simplified view of an example arrangement for a fitting area according to the present invention.
Figure 2B:
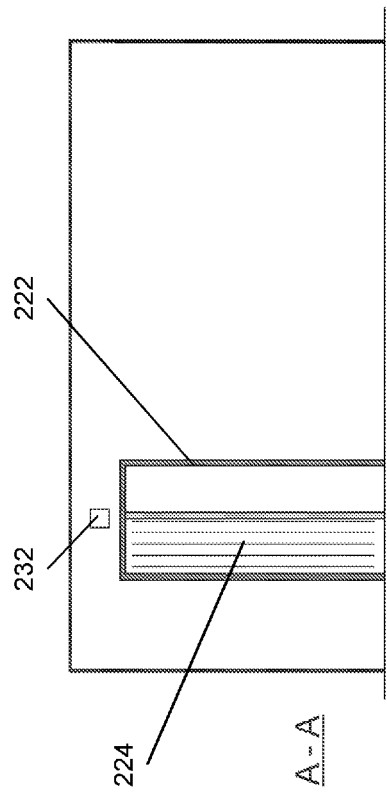
Figure 2C:
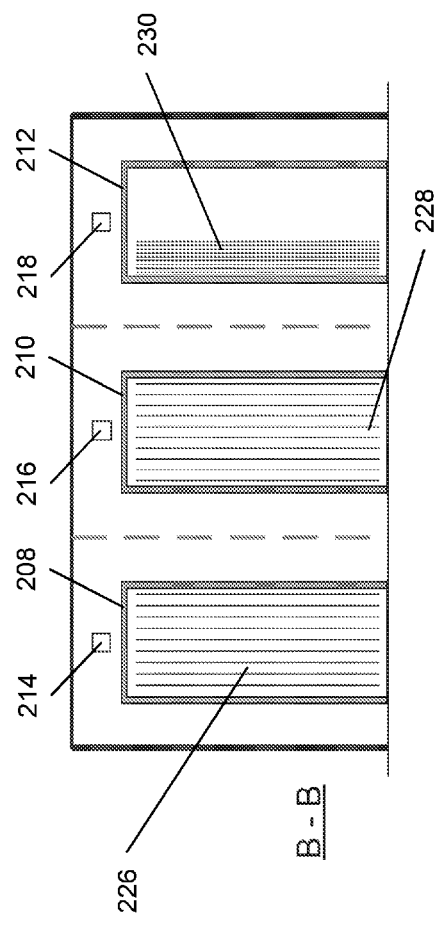

FIGS. 2A-C present a schematic and simplified view of an example arrangement of the present invention where one embodiment of the invention is used in the fitting area 200 or fitting space. The fitting area 200 comprises fitting rooms 202, 204, 206 and an entrance area 220 to the individual fitting rooms. In this embodiment means for detecting entrance, departure and/or presence of a person in a fitting room can be arranged to essentially cover the area of whole fitting area 200 including the fitting rooms 202, 204, 206 and the entrance area 220. Means for detecting entrance, departure and/or presence of a person can be e.g. floor sensors or planar sensors arranged on the floor or floor structure. Means for detecting entrance, departure and/or presence of a person can be able to track also movement of a person and to which fitting room the person has moved.

In the embodiment presented in FIGS. 2A-C means for detecting number, type, size and/or color of products brought to the fitting room and/or fitting area is implemented with means for detecting presence and/or number of remotely readable identification tags, electronic article surveillance tags and/or electronic price labels. Means for detecting presence and/or number of remotely readable identification tags, electronic article surveillance tags and/or electronic price labels can be arranged as detector gates 208, 210, 212, 222 to the doorways. The detectors can be always activated or they can be activated when a person is approaching the gate or near the gate.

The gate sensor can e.g. monitor how many remotely readable identification tags, electronic article surveillance tags and/or electronic price labels have moved inside to the fitting area or fitting room and what is the type, size and/or color of products brought to the fitting room and/or fitting area to which products remotely readable identification tags, electronic article surveillance tags and/or electronic price labels are attached. It's also possible to monitor how many remotely readable identification tags, electronic article surveillance tags and/or electronic price labels have moved out of the fitting room/area. It's also possible in one embodiment to identify and detect which remotely readable identification tags, electronic article surveillance tags and/or electronic price labels have moved inside the fitting area or fitting room and/or also which remotely readable identification tags, electronic article surveillance tags and/or electronic price labels have moved out of the fitting room. The fitting area may have one doorway and one detector 222 for entering the fitting area 200 at the doorway of the entrance area 220 of the fitting area. The fitting rooms 202, 204, 206 have separate doorways and detector gates 208, 210, 212 can be arranged to doorways of the fitting rooms. The detector gates can be e.g. RFID-detector gates. The doorways can be equipped with e.g. doors and/or curtains.

The arrangement of the invention can function for example in the following way. The person comes to the fitting area through the gate detector 222 and number, type, size and/or color of products brought to the fitting room and/or fitting area can be detected by detecting and reading remotely readable identification tags, electronic article surveillance tags and/or electronic price labels is detected. As the person then moves to the fitting room the sensor gate of the fitting room can detect number, type, size and/or color of products brought to the fitting room by detecting and reading remotely readable identification tags, electronic article surveillance tags and/or electronic price labels brought to the fitting room. If predefined criteria relating to number, type, size and/or color of products is fulfilled the arrangement generates an alarm.

In one embodiment of the invention it's enough that the arrangement only has one means for detecting presence and/or number of remotely readable identification tags, electronic article surveillance tags and/or electronic price labels e.g. a detector gate 222 for the whole fitting area at the entrance of the fitting area.

In one embodiment of the invention the arrangement can indicate whether the fitting room is free or occupied. This can be done e.g. with signaling lights 214, 216, 218, 232 like presented in FIGS. 2B and 2A. There can be separate signaling lights 214, 216, 218, for fitting rooms and separate signaling light for entrance area 220 and/or the whole fitting area 200. In one embodiment of the invention the arrangement can indicate what the estimated time is when a fitting room and/or the next fitting room is available.

In one embodiment of the invention if the signal of the remotely readable identification tag, electronic article surveillance tag and/or electronic price label has disappeared when present in the fitting room, the arrangement can perform an alarm at the cashier because the price label is linked with the electronic article surveillance tag and/or electronic price label. In one embodiment of the invention also if a person has had more products in the fitting room than which he has brought out of the fitting room (leaving product, remotely readable identification tag, electronic article surveillance tag and/or electronic price label to the fitting room), an alarm can be made at the cashier because the system is able to record and check which products have been at the same time in the same fitting room and missed items left to the fitting room have been linked to the product(s) brought to the cashier.

In the premises where the arrangement of the invention is installed also electronic article surveillance system can be used. The electronic article surveillance system can comprise at least one detection means configured to detect electronic article surveillance tags. Detection means can be e.g. gate alarms, security ports or other kind of detectors which are able to detect electronic article surveillance tags.

The electronic article surveillance system can be a radio-frequency based system and electronic article surveillance tag can be a radio-frequency tag such as an RFID-tag. The arrangement of the present invention can comprise electronic article surveillance system or it can be linked or used with an electronic article surveillance system for performing alarms or notifications.

The electronic article surveillance system can be configured to give an alarm signal if an active electronic article surveillance tag is detected by the detection means from the area where the detection means are able to detect the presence of an active electronic article surveillance tag.

In one embodiment the electronic article surveillance system comprises security ports and alarm signal is given based on the response from security ports when active electronic article surveillance tag is exported through the security port. The alarm can be made in this case if the electronic article surveillance tag is exported through the port.

The arrangement of the invention can be used with products having only an electronic article surveillance tag, only an electronic price label and/or both an electronic article surveillance tag and an electronic price label. If the product has both an electronic article surveillance tag and an electronic price label, these can be integrated into one structure or they can also be arranged to different and separate structures such as tags. One advantage of an integrated solution is that only one item has to be attached to the product and handled by the personnel of the store.

Figure 3:
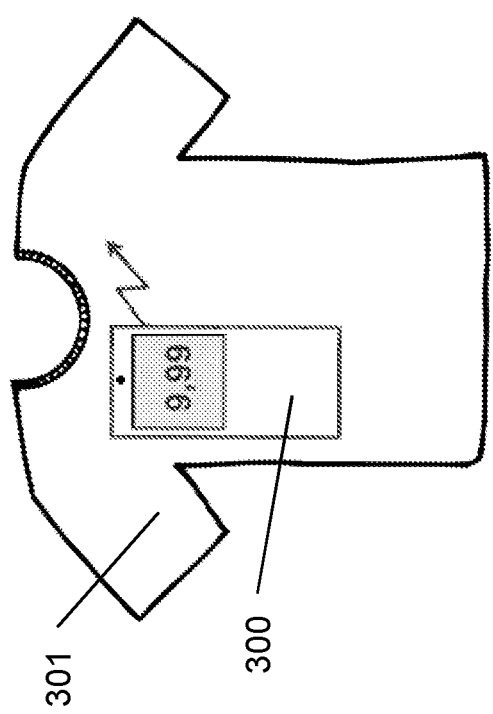
FIG. 3 presents an example implementation of products with an electronic price label and, FIG. 4 presents an example implementation of an electronic price label.

In the solution of the invention where electronic price labels are used, electronic price labels can be attached to the products 301 such as clothes such that they are easily perceivable for the customers. An example embodiment of the electronic price label is presented in FIG. 3. Electronic label tag 300 can have attachment means (not shown in FIG. 3) by which the electronic label tag 300 can be attached to products. Also external attachment means can be used to attach the electronic label tags to products. External attachment means can be e.g. pins, loops or at least partly transparent pockets.

Figure 4:
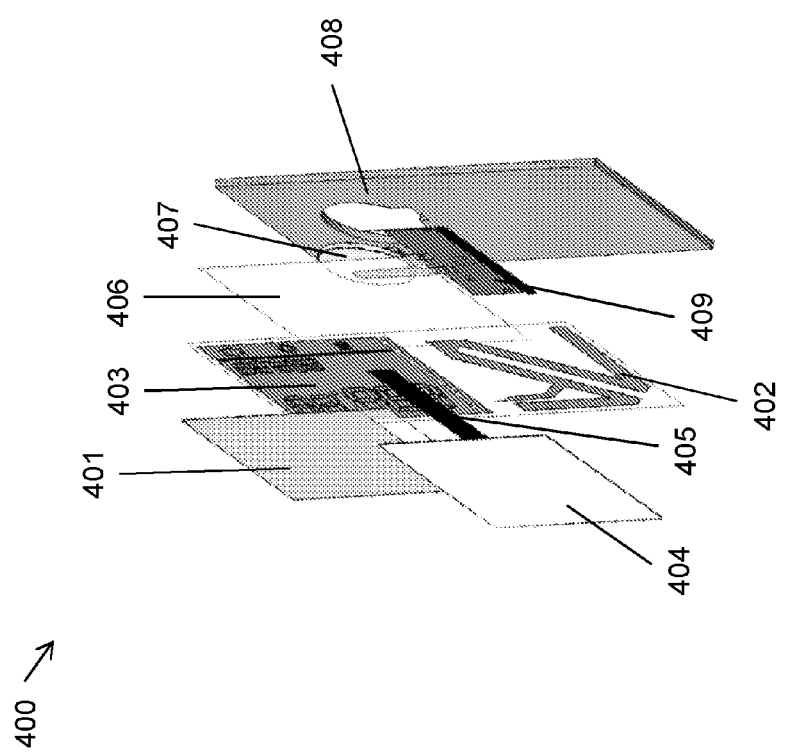

FIG. 4 presents an example embodiment of an electronic price label 400. The electronic price label 400 has a layered structure. It consists essentially of a flexible e-paper display 401 comprising e-paper display material, a backplane layer 403 as a flexible circuit board having an electrode structure for controlling the display, a battery 407, which can be substantially rigid or flexible, and wherein the thickness of said battery is greater than the thickness of said flexible display layer 401 and the thickness of said flexible backplane layer 403, and a resilient layer 408 having a cut-out space for said battery 407, wherein said resilient layer 408 is arranged to provide a substantially even total thickness of said label.

Electronic price labels have an electronic display which can be updated by an electronic price label system. Furthermore, the electronic price label system comprises at least a central processing unit connected to a base station or other communication means, via which it is possible to transmit, for example, updated price information and other control information to the electronic price label.

The electronic price labels communicate in a wireless manner with the base station. Wireless communication method may be based on any known wireless communication technology, but in order to save battery life of the electronic price labels, passive backscatter radio communication is preferred. In this approach the base stations actively send radio signals and instead of answering with active radio transmission, the electronic price label do not use a radio transmitter; instead, they answer by modulating the reflected power of the base station signal. The modulation is achieved, typically, by changing the load state of the antenna in the electronic price label, for example, by connecting and disconnecting the antenna between the ground and non-ground potential. This modulation of the backscattered signal allows for the electronic price label to answer to the base stations and further to the store level server. The system can be configured to use certain frequency band for communication between electronic price labels and base station(s), e.g. 868 MHz frequency band, 2.4 GHz frequency band or any other frequency band allowed to be used for an electronic price label system. In one embodiment of the invention the system can use multiple frequency bands for communication between electronic price label and base station(s) and/or different kind of diversity techniques. Electronic price label can use its antenna or one of its antennas for communicating with the base station with backscatter radio communication.

Each electronic price label can be identified by its own identification code for electronic price label system that the electronic price label in question knows to listen for in the transmission from the base station. After receiving new information, instructions or commands from the store server via base station, the electronic price label can acknowledge the reception of these instructions by using the reflected backscattering modulated properly and timely for the store level server to identify that the response is coming from the electronic price label in question. To facilitate that the store server may have a certain listening period after a transmission directed to a certain electronic price label for giving the module possibility to answer during that time.

In one embodiment of the invention communication module can comprise an active radio transmitter instead of backscatter radio communication means. In this embodiment the radio transmitter is preferably low power RF-transmitter or transceiver.

Information stored to electronic price labels and communication between the electronic price labels and base stations can be encrypted.

Also energy harvesting methods may be used to provide energy to the electronic price label, such as solar or photovoltaic cells. Also capacitors, such as electric double-layer capacitors, i.e. supercapacitors, can be used instead or with the battery. In one embodiment of the invention the energy source, such as battery, of the electronic price label can be changed. In one embodiment of the invention the electronic price label has an opening e.g. in the back side of the electronic price label, via which the energy source can be removed from the electronic price label and inserted to the electronic price label.

The display is arranged to display the information related to the product. Also other product information can be added to electronic price label such as name of the product, logo and/or some other information relating to the product. The information which is in the display can be e.g. price, sale price and/or discount.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192. Instead of segment display type, the display type can also be pixel type display.

The electronic price label further comprises wireless communication capabilities with at least one antenna 402 consisting of any shape e.g. two triangular antenna patterns on the same flexible circuit board as the display control, as the electronic price label module is implemented as semi-active RF tags that is powered from incident RF communicating via modulated backscatter, and a separate flexible circuit board. The electronic price label is configured to communicate with the antenna 402 with electronic price label system and electronic article surveillance system.

The battery 407 has been encapsulated in a cut-out space by laminating said display 401, backplane 403, control circuit board and resilient layers 408 together. Further, the display layer 401, the backplane layer 403, the resilient layer 408 and the battery 407 are located between two outside protective layers (not shown) forming a body of the electronic price label for an electronic price label suitable to be attached to a product. Also a protective layer 406 can be arranged at the bottom of the backplane layer 403 to prevent moisture from getting to display layer 401 which is sensitive to moisture variations. The rigid component has been attached to the separate flexible printed circuit board 409 operating as a sub module under the backplane and the antenna. Backplane layer 403 as a flexible circuit board having an electrode structure for controlling the display and separate flexible printed circuit board 409 can be considered to form control electronics of the electronic price label.

The backplane and the antenna circuit board 403 and the electronic price label control circuit board are patterned plastic films (PET or PC or PVC or polyimide) with patterned conductive copper layers. The forming and patterning of the conductors can be made using any method known as such for a person skilled in the art, for example by direct printing of conductive ink or by etching of a thin metal layer. The lower surface of the backplane 403 has display segment lead lines patterned in a similar way. Each display segment is electrically connected to a corresponding display segment lead line for example through a preferably laser processed via. Also other ways of providing feed-through vias are possible as is evident for a person skilled in the art. In order to establish an electrical contact from the back-plane segments to the display front electrode, which is in this example on the front surface of the flexible electronic display web, an electrically conducting tape 405 is laminated on the backplane area acting as a front electrode feed line. Alternatively and instead of an electrically conducting tape 405, electrically conducting paste or similar material with adhesive nature may be dispensed on the backplane web to make contact with the front plane electrodes.

It's also possible to add further layers 404 to change the visual appearance of the electronic price label or to protect the electronic price label.

The electronic price label can have multiple memory locations for the information, for example for price information. The electronic price labels can also comprise multiple different views stored in the memory locations i.e. different pages that include different information to be displayed. Staff can have its own pages which can be displayed only with a special staff equipment. Also loyalty customers or other group of users can have own pages which can be activated using e.g. loyalty card. E.g. Loyalty Card holders can have special price displayed for them when loyalty card is brought close to the electronic price label.

In one embodiment of the invention the electronic price label comprises an electronic article surveillance part, e.g. a tag, which can be detected by an electronic article surveillance system. This kind of electronic price label can always respond to the query of the detection means of the electronic article surveillance system and this way an alarm can always be generated reliably when active electronic article surveillance part is in the range of the detection means.

In the embodiment where the electronic price label comprises an electronic article surveillance part, the electronic price label can comprise two integrated circuits, e.g. ASICs or microprocessors, which first integrated circuit is configured to control the communication module for receiving information from base station related information and the second integrated circuit is configured to control the electronic article surveillance part. The integrated circuits can be connected to each other and they can send information to each other. They can also switch off and on each other. If one receives information it can forward it to another integrated circuit.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention. Embodiments described in the description in combination with other embodiments can be also used as separate embodiments.

The invention claimed is:

1. A method for monitoring fitting rooms and/or fitting areas comprising:
    detecting a number, type, size and/or colour of products brought to the fitting room and/or fitting area by detecting a presence of a remotely readable identification tag, electronic article surveillance tag and/or electronic price label in the fitting room and/or fitting area and reading product information linked to the remotely readable identification tag, electronic article surveillance tag and/or electronic price label, comparing the detected number, type, size and/or colour of products to predefined criteria, the criteria relating to the number, type, size and/or colour of products, generating an alarm based on the detected number, type, size and/or colour of products if at least one predefined criterion is fulfilled, wherein the predefined alarm criteria is fulfilled when more than two sizes and/or colour of a same product are detected in the fitting room or fitting area, more than two different sizes of a same product are detected in the fitting room or fitting area and/or more than one different types of product are detected in the fitting room or fitting area, the different types being clothes for children, clothes for men and clothes for women.

2. A method according to claim 1, wherein the product information is read directly from the remotely readable identification tag, electronic article surveillance tag and/or electronic price label.

3. A method according to claim 1, wherein the product information is read from a database based on the information of the remotely readable identification tag, electronic article surveillance tag and/or electronic price label.

4. A method according to claim 1, wherein the alarm is generated to a control system of the store, to a mobile device such as a mobile phone or tablet and/or any device such as cashier equipment.

5. A method according to claim 1, wherein the remotely readable identification tag, the electronic article surveillance tag and/or the electronic label is a radio frequency tag such as an RFID-tag.

6. A method according to claim 1, wherein detecting the presence and/or number of remotely readable identification tags, electronic article surveillance tags and/or electronic price labels is performed by a gate detector, radio frequency tag reader or an RFID-gate.

7. An arrangement for monitoring fitting rooms and/or fitting areas, comprising:
a sensor for detecting a presence of a remotely readable identification tag, electronic article surveillance tag and/or electronic price label,
wherein the arrangement is configured to:
detect a number, type, size and/or colour of products brought to the fitting room and/or fitting area by detecting the presence of the remotely readable identification tags, electronic article surveillance tags and/or electronic price labels in the fitting room and/or fitting area and reading product information linked to the remotely readable identification tag, electronic article surveillance tag and/or electronic price label, compare the detected number, type, size and/or colour of products to predefined criteria, the criteria relating to the number, type, size and/or colour of products, and generate an alarm based on the detected number, type, size and/or colour of products if at least one predefined criterion is fulfilled, wherein the predefined alarm criteria is fulfilled when more than two sizes and/or colour of a same product are detected in the fitting room or fitting area, more than two different sizes of a same product are detected in the fitting room or fitting area and/or more than one different types of product are detected in the fitting room or fitting area, the different types being clothes for children, clothes for men and clothes for women.

8. An arrangement according to claim 7, wherein the arrangement is configured to read the product information directly from the remotely readable identification tag, electronic article surveillance tag and/or electronic price label.

9. An arrangement according to claim 8, wherein the arrangement is configured to read the product information from a database based on the information of the remotely readable identification tag, electronic article surveillance tag and/or electronic price label.

10. An arrangement according to claim 7, wherein the arrangement is configured to generate the alarm to a control system of the store, to a mobile device such as a mobile phone or tablet and/or any device such as cashier equipment.

11. An arrangement according to claim 7, wherein the remotely readable identification tag, the electronic article surveillance tag and/or electronic label is a radio frequency tag.

12. An arrangement according to claim 7, wherein the sensor for detecting presence of a remotely readable identification tag, electronic article surveillance tags and/or electronic price labels is a gate detector, radio frequency tag reader such as an RFID-tag reader or an RFID-gate.

* * * * *